United States Patent [19]

Kaneko

[11] 4,054,964
[45] Oct. 25, 1977

[54] DETACHABLE LUGGAGE CASTER ROLLER

[75] Inventor: Katsuyoshi Kaneko, Tokyo, Japan

[73] Assignee: Maruwa Echo Co., Ltd., Tokyo, Japan

[21] Appl. No.: 625,877

[22] Filed: Oct. 24, 1975

[51] Int. Cl.² .............................................. B60B 33/00
[52] U.S. Cl. ........................................ 16/20; 308/238; 16/23; 403/158; 403/161
[58] Field of Search ............... 16/20, 22, 23; 308/219, 308/238; 403/158, 161

[56] References Cited

U.S. PATENT DOCUMENTS

| 3,231,926 | 2/1966 | Stollman | 16/22 |
|---|---|---|---|
| 3,283,358 | 11/1966 | Merriam | 308/238 X |
| 3,837,039 | 9/1974 | Rehrig | 16/20 |
| 3,920,293 | 11/1975 | Takeuchi | 308/191 |

*Primary Examiner*—Werner H. Schroeder
*Assistant Examiner*—Conrad L. Berman
*Attorney, Agent, or Firm*—Young & Thompson

[57] ABSTRACT

A detachable luggage caster roller for suitcases, luggage and the like is comprised of a roller support bracket formed of synthetic resin and including a cylindrical male member and a base plate adapted to be secured directly or indirectly through a seat member to the luggage and formed of synthetic resin, said base plate including a cylindrical female member adapted to be slidably engaged, directly or indirectly with said cylindrical male member of said roller support bracket through point and line contact. The roller is formed of different kinds of synthetic resin and comprised of a tread reinforced by a bridge-shaped rib embedded therein and a sleeve bearing formed of synthetic resin impregnated with lubricating oil.

6 Claims, 19 Drawing Figures

DETACHABLE LUGGAGE CASTER ROLLER

This invention relates to a detachable luggage caster roller for suitcases, luggage and the like which are brought from place to place by manual effort.

Heretofore, it has been the common practice to use a caster roller which is comprised of a roller support bracket for rotatably supporting a roller therein and formed of sheet metal and a base plate adapted to be secured directly or indirectly through a seat member to a piece of luggage and also formed of sheet metal, the roller support bracket being carried rotatably by the base plate. Between the base plate and the roller support bracket are inserted ball-shaped rotatable bodies for the purpose of changing the moving direction of the luggage in a smooth manner and of rotating both the roller support bracket and the roller in a smooth manner against the load of the luggage. The ball-shaped rotatable bodies are metal balls and the roller support bracket is carried rotatably by the base plate acting as a ball bearing through a surface contact. As a result, such surface contact portions are required to be fed with a lubricating oil in order to obviate difficulty in rotation due to wear of the surface contact portions. In addition, there is a risk of the surface contact portions being clogged with dust, thereby hindering smooth rotation of both the roller support bracket and the roller. In order to avoid such disadvantages, inspection and oil lubrication are necessry every time a suitable period elapses and hence provision must be made of a dust shield comprised of an oil seal or the like. As a result, the existing caster roller is not only complex in construction and difficult to manufacture, but also troublesome in handling and short lived.

In addition, the base plate operating as the ball bearing must be precisely machined.

In the conventional caster roller, the roller support bracket has also been formed of metal, so that both the base plate and the roller support bracket are liable to rust, heavy in weight and expensive.

More particularly, the caster roller using the ball bearing when clogged with dust becomes difficult to lubricate and hence generates noise and there is a risk of the rotation being hindered by acceleration of pitching movement. As a result, frequent leakage of water occurs and hence the caster roller is not suitable for suitcases and the like which are brought from place to place on the dusty ground and prevent by manual effort.

A caster roller formed of synthetic resin has been developed for the purpose of providing a decrease in weight. But, such caster roller is liable to be deformed due to friction heat.

Heretofore, it has also been the common practice to use a caster roller formed of metals and including a rubber tread.

Such conventional caste roller is provided in its bearing with metal rotatable bodies such as metal balls which must be finished by precise working steps. As a result, the existing caster roller becomes expensive and relatively heavy in weight, so that it is unsuitable as a caster roller for luggage and the like. In addition, the rubber tread becomes excessively worn. The use of the principal parts formed of metals causes these parts to rust easily and hence the caster roller is short lived.

A caster roller including a roller formed of synthetic resin with the rotatable bodies omitted has also been available on the market. Such kind of caster roller makes use of a rotary shaft formed of metal and extended through a boss and hence has the disadvantage that the boss is easily deformed by the heat produced by the excessively great friction between the metal rotary shaft and the boss, so that the roller cannot rotate in a smooth manner.

Experimental tests have yielded the surprising result that all of the foregoing disadvantages can be obviated by the provision of a caster roller whose constituent parts are improved in or relating to their material and construction.

A principal object of the invention, therefore, is to provide a detachable luggage caster roller which is light in weight compared with existing metal caster rollers, can smoothly rotate without generating noise on a horizontal plane when the moving direction of the luggage is changed, and can be easily cleaned when the caster roller becomes dirty.

Another object of the invention is to provide a detachable luggage caster roller which can obviate difficulty in rotation due to penetration of dust so as to easily operate in a smooth manner, is oil and rust resistant and hence long lived.

A further object of the invention is to provide a detachable luggage caster roller which can be formed of synthetic resin by the conventional injection molding process in a mass production scale and less expensive manner, provides a material increase in yield, and can freely be colored so as to provide a beautiful caster roller in appearance.

A still further object of the invention is to provide a detachable luggage caster roller which is formed of synthetic resin, requires no rotatable bodies such as metal balls and oil lubrication, light in weight, rustproof, which has such shape that unnaturally concentrated stress is avoided, is detachable and can be cleaned in an easy manner.

Another object of the invention is to provide a roller for casters which can obviate the above mentioned disadvantages inherent to the conventional rollers.

The invention will now be described in detail with reference to the accompanying drawings, wherein.

Figure 1:
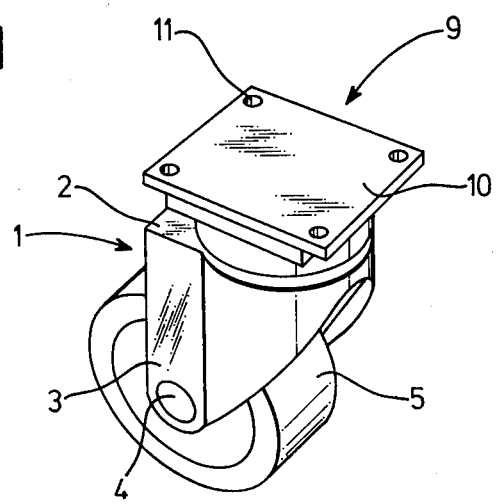
FIG. 1 is a perspective view of one embodiment of a caster roller according to the invention.
Figure 2:
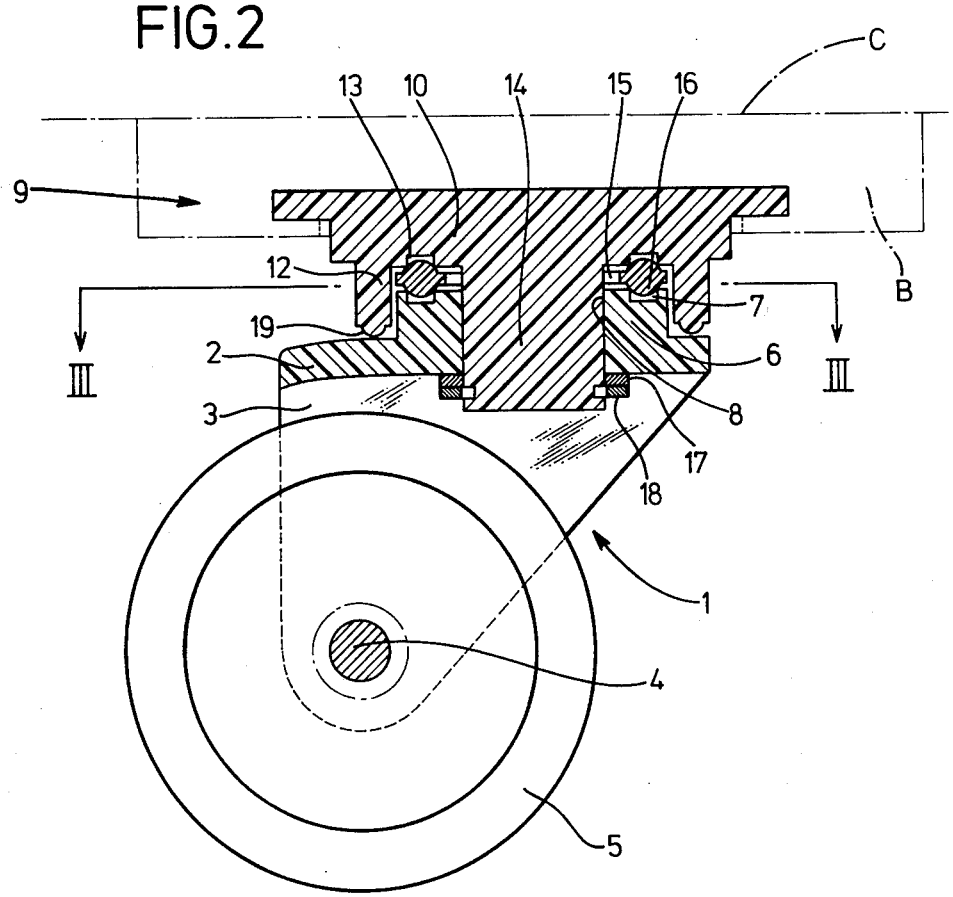
FIG. 2 is a vertical center sectional view through the rotational axis of the roller of FIG. 1 on an enlarged scale.
Figure 3:
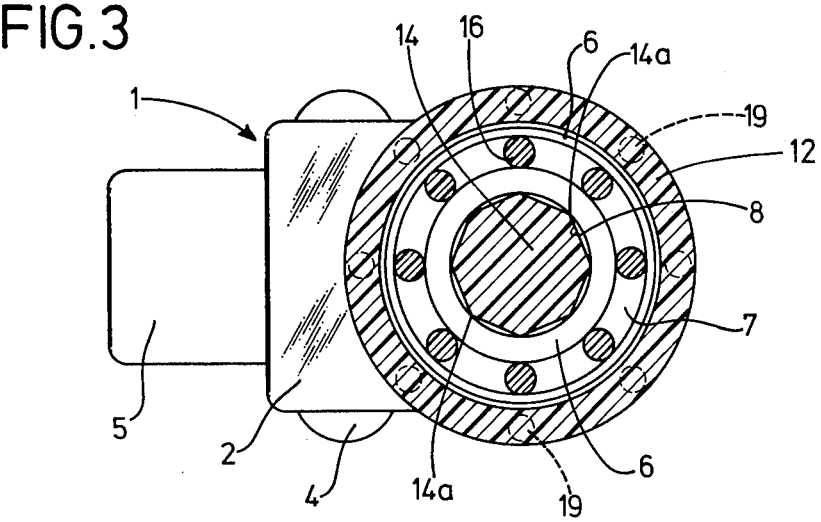
FIG. 3 is a sectional view taken on the line III—III of FIG. 2.

In FIGS. 1 to 3 is shown one embodiment of a caster roller according to the invention. In the present embodiment, a roller support bracket 1 is formed of synthetic resin such as polyacetal resin and the like and comprises of an upper yoke 2 and bifurcated legs 3 made integral with the upper yoke 2 and downwardly suspended therefrom. The bifurcated legs 3 rotatably support ends of a rotary shaft 4.

Between the bifurcated legs 3 is arranged a roller 5 which is rotatably supported by the shaft 4.

From the upper yoke 2 is upwardly projected a male member 6 which is provided at its top surface with an annular groove 7 which is square in section. In addition, the male member 6 is provided at its center with an axial hole 8 extended therethrough. The roller support bracket 1 is adapted to be rotated about the male member 6.

If the shaft 4 is eccentrically displaced from the male member 6, the load of a piece of luggage to be supported by a caster roller is not directly applied in a vertical direction to the roller 5. As a result, the center of gravity of the roller support bracket 1 is so changed that the roller 5 can be rotated in a smooth manner when the direction of the luggage C is changed.

A base plate 9 to be secured through a seat member B to the luggage C, for example, a suitcase, is made of synthetic resin which is the same as that used for the roller support bracket 1 and serves to rotatably carry the bracket 1.

The base plate 9 is comprised of a substantially rectangular base 10 which is provided at its four corners with holes 11 (FIG. 1). The center portion of the base 10 is made larger in thickness than remaining portions for the purpose of increasing its durability. From the lower surface of the base 10 is downwardly projected a substantially cylindrical female member 12. The female member 12 is provided at its inner base surface with an annular groove 13 which is substantially square in section and at its center with a shaft portion or post 14 made integral therewith and downwardly projected from the base 10. The shaft portion 14 is made polygonal in section as shown in FIG. 3.

The upper annular groove 13 is aligned in the vertical direction with the lower annular groove 7. These upper and lower annular grooves 13 and 7 are separated from each other to form an annular gap in which is inserted a thrust sliding body 15. The thrust sliding body 15 is formed of synthetic resin which is the same as that of the roller support bracket 1 and is comprised of an annular disc which is provided at its upper and lower peripheral surfaces with projection 16 equally spaced apart from each other. Each of these projections 16 may preferably be made semi-spherical in shape such that the outer surface of the projection 16 is brought into point contact with the edges of the upper and lower annular grooves 13, 7.

The shaft portion 14 of the base plate 9 may be a regular polygon in section such as a hexagon, octagon, dodecagon and the like as shown in FIG. 3. It is preferable to make the contact area between the shaft portion 14 and the inner peripheral surface of the hole 8 of the male member 6 as small as possible. From this point of view, it is not preferable to use a polygon which is similar to circle. More or less curvature is given to each corner 14a of the polygonal shaft portion 14 for the purpose of permitting the shaft portion 14 to slidably contact with the inner peripheral surface of the hole 8 of the male member 6.

The shaft portion 14 is extended through the hole 8 of the male member 6 so as to rotatably support the male portion 6 by the female portion 12. That lower end of the shaft portion 14 which is projected out of the lower surface of the yoke 2 is provided with a suitable clamping member 18 which abuts through a packing 17 aganist the lower surface of the yoke 2, thereby assembling base plate 9 with the roller support bracket 1.

The shaft portion 14 is made integral with the base plate 9 so as to make the caster roller simple in construction and to assemble it in a simple manner. In addition, the rotary shaft 4 is arranged eccentrically from the male member 6 so as to change the center of gravity of the caster roller. As a result, even if the load is applied to the sliding surface between the shaft portion 14 ad the hole 8, it is possible to rotate the roller support bracket 1 in a smooth manner, thereby easily changing the moving direction of the caster roller.

In the above mentioned embodiment, the male member 6 is projected upwardly from the roller support bracket 1 and the female member 12 is projected downwardly from the base plate 9. In the present embodiment, if the caster roller is moved while rotating the roller 5, the opening edge of the female member 12 is directed toward the roller side, so that it is possible to prevent dust from penetrating into the opening of the female member 12.

Alternatively, the female member 12 may be projected from the roller support bracket 1, while the male member 6 may be projected from the base plate 9.

Reference numeral 19 designates a number of projections arranged along the lower end surface of the female member 12 and equally spaced apart from each other. These projections 19 contact the upper surface of the yoke 2 of the roller support bracket 1. As a result, the load of the luggage C in a thrust direction is applied from the base plate 9 through the projections 16 to the male member 6. In this case, the projections 19 cause the load of the luggage C to distribute along the periphery of the yoke 2, thereby preventing the luggage C from being displaced in a horizontal direction.

Figure 4:
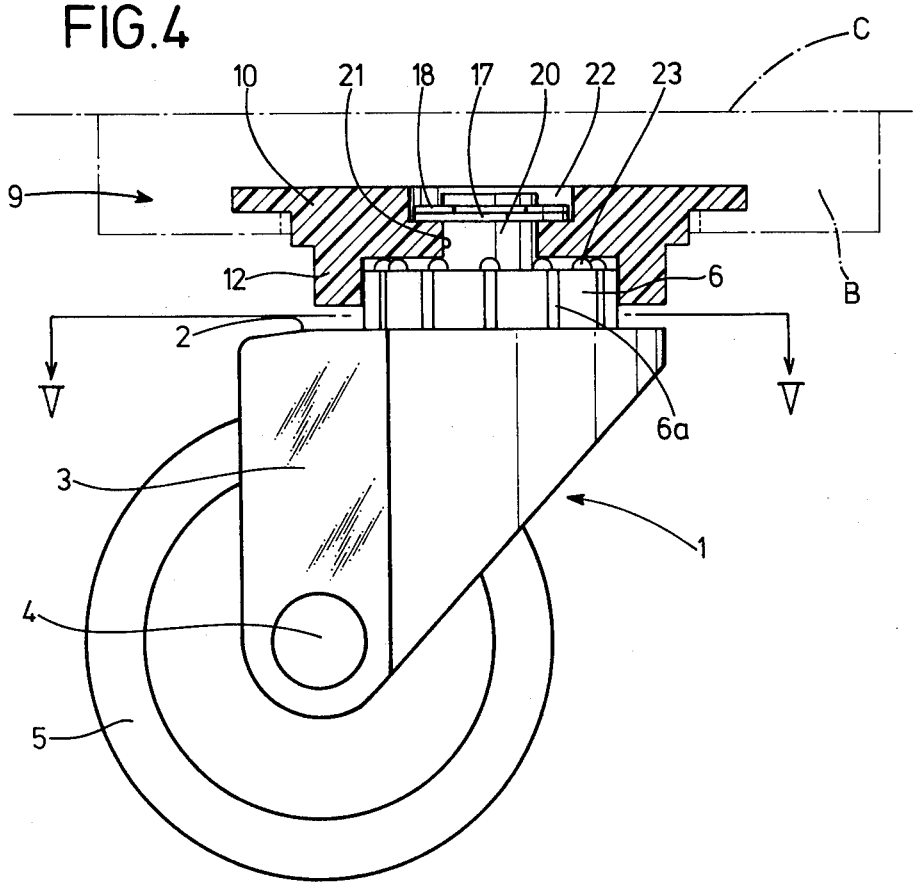
FIG. 4 is a side elevational view of another embodiment of the caster roller according to the invention, the base plate being shown in section.
Figure 5:
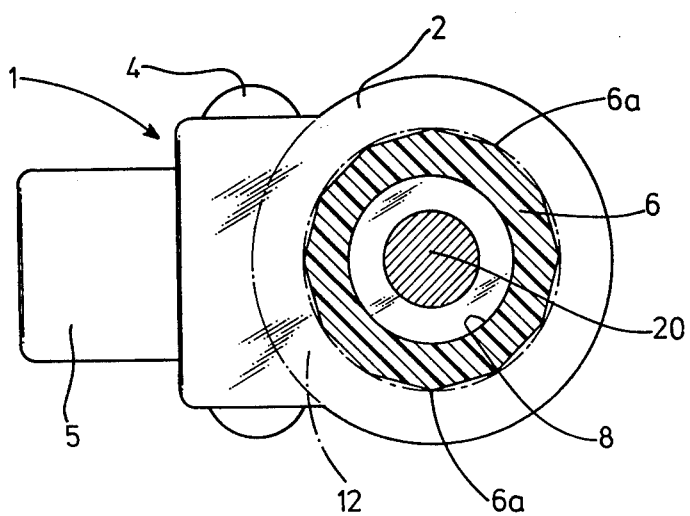
FIG. 5 is a sectional view taken on the line V—v of FIG. 4.

In another embodiment shown in FIGS. 4 and 5, provision is made of a connecting rod or post 20 formed separately formed both the roller support bracket 1 and the base plate 9. The connecting rod 20 is extended through the hole 8 of the male member 6 and a hole 21 formed in the base 10. To that upper end of the connecting rod 20 which projects out of a depressed portion 22 formed in the upper surface of the base plate 9 is secured the clamping member 18 which abuts through the packing 17 against the base surface of the depressed portion 22.

In the embodiment shown in FIGS. 4 and 5, the male member 6 projecting from the yoke 2 of the roller support bracket 1 is provided at its top surface with a number of projections 23 arranged circumferentially and equally spaced from each other. The male member 6 is made polygonal in section as shown in FIG. 5 and loosely fitted into the female member 12 downwardly projecting from the lower surface of the base plate 9.

The male member 6 is made polygonal in section in the same manner as the shaft portion 14 of the base plae 9 of the embodiment shown in FIGS. 1 to 3 so as to make each corner 6a of the male member 6 in contact with the inner peripheral surface of the female member 12.

As above described, the male member 6 is provided at its upper surface with a number of projections 23 arranged circumferentially along it and equally spaced apart from each other. These projections 23 make contact with the inner base surface of the female member 12 with least contact area. In addition, it is preferable to give the contact surface of each of the projections 23 some curvature so as to permit the male member 6 to slidably rotate in a smooth manner. Each of the projections 23 may be made semispherical in shape.

Alternatively, the male member 6 which is circular on its outer periphery and flat on its top surface may be loosely fitted in the female member 12 which is polygonal on its inner periphery and provided at its inner base with the projections 23.

Figure 6:
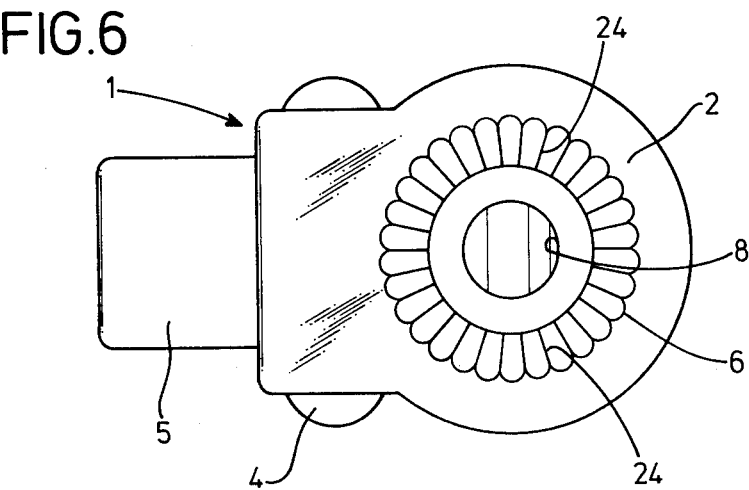
FIG. 6 is a plane view of a further embodiment of the roller support bracket according to the invention.
Figure 7:
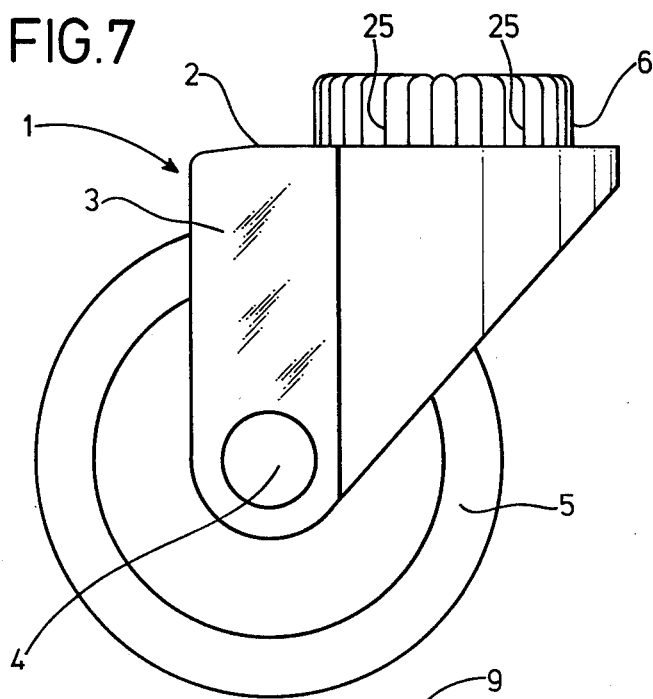
FIG. 7 is its side elevational view.

In FIGS. 6 and 7 is shown another embodiment of the invention. In the present embodiment, the upwardly projected male member 6 of the roller support bracket 1 is provided at its top surface with radially extending indentations 24 adjoined with each other to form a V-shaped space therebetween and at its outer peripheral surface with vertically extending grooves 25 adjoined with each other to form a V-shaped space therebetween.

Figure 9:
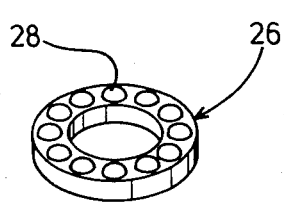
FIG. 9 is a perspective view of an annular thrust sliding disc inserted between the male and female members of the caster roller of FIG. 8.
Figure 10:
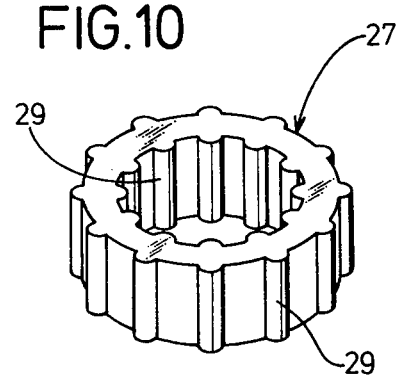
FIG. 10 is a perspective view of a radial sliding bush inserted between the male and female members of the caster roller of FIG. 8.
Figure 8:
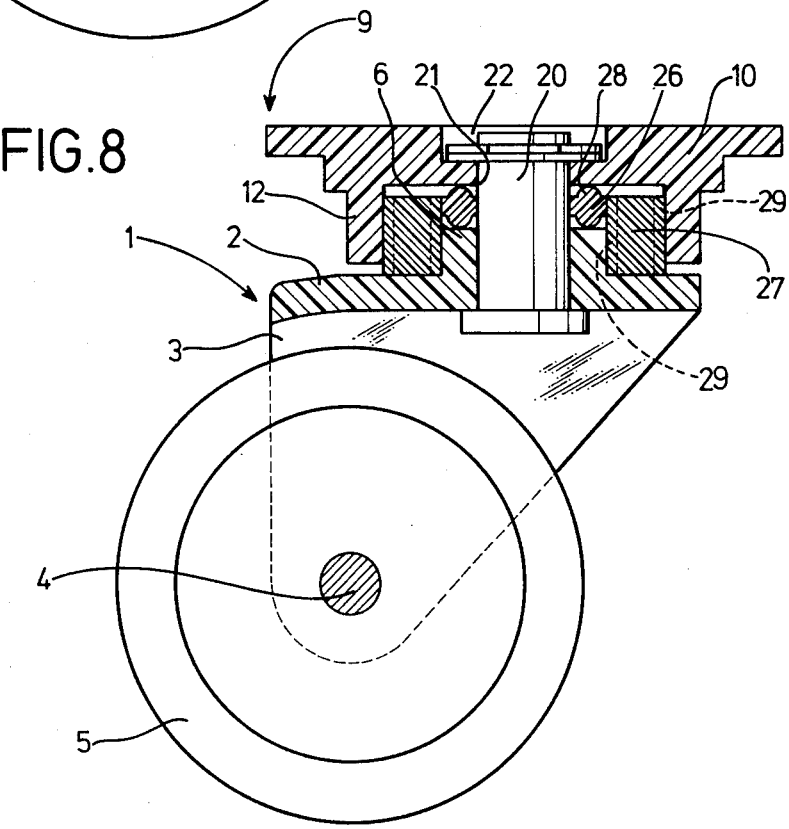
FIG. 8 is a vertical center sectional view of a still further embodiment of the caster roller according to the invention.

In FIGS. 8, 9 and 10 is shown a further embodiment of the invention. In the present embodiment, provision is made of a thrust sliding annular disc 26 and a radial sliding bush 27. The thrust sliding annular disc 26 is inserted between the flat top surface of the male member 6 and the inner base surface of the female member 12 and the radial sliding bush 27 is inserted between the outer peripheral surface of the male manner 6 and the inner peripheral surface of the female member 12. As shown in FIG. 9, the thrust sliding annular disc 26 is formed of synthetic resin which is the same as that of the roller support bracket 1 and provided at its upper and lower surfaces with a number of projections 28 equally spaced apart from each other. As in the case of the projections 16 provided for the embodiment shown in FIGS. 1 to 3, each of these projections 28 may preferably be semispherical in shape such that the outer surface of the projections 28 is brought into point contact with the flat top surface of the male member 6 and with the inner base surface of the female member 12.

As shown in FIG. 10, the radial sliding bush 27 is formed of synthetic resin which is the same as that of the roller support bracket 1 and provided at its outer and inner peripheral surfaces with a number of vertical extending ridges 29 equally spaced apart from each other. It is a matter of course that some curvature is given to the top end of each of both the projections 28 and the ridges 29 so as to permit the inner base surface and the inner peripheral surface of the female member 12 to slidably rotate in a smooth manner.

It is preferable to make both the thrust sliding annular disc 26 and the radial sliding bush 27 slightly rotatable relative to each other so as to reduce the resistance against rotation.

Figure 11:
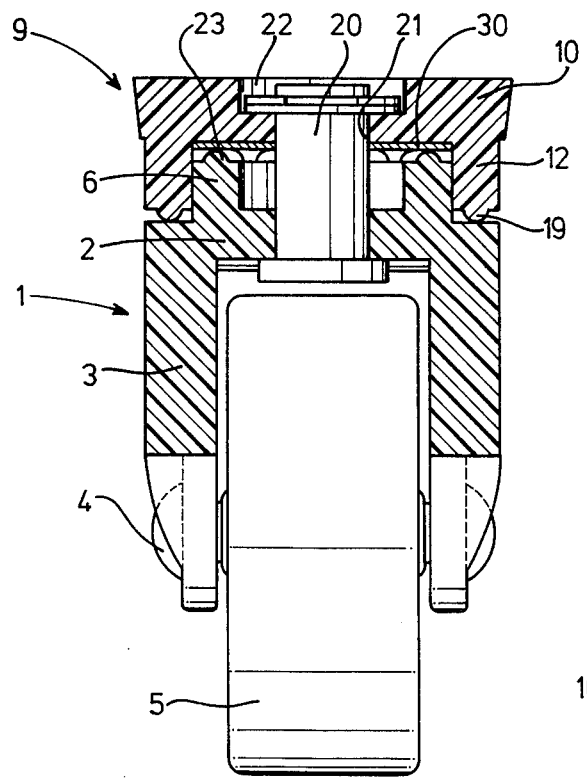
FIG. 11 is a longitudinal sectional view of another embodiment of the caster roller according to the invention, the assembly being shown from its front side.
Figure 12:
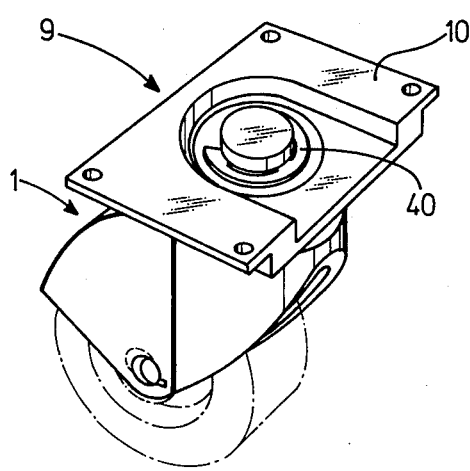
FIG. 12 is a perspective view of another embodiment of the caster roller according to the invention.

In FIG. 11 is shown a still further embodiment of the invention. In the present embodiment, provision is made of a sliding member 30 formed of stainless steel. The sliding member 30 is inserted between the flat inner base surface of the female member 12 and the projections 23 of the male member 6. The presence of the sliding member 30 ensures a more smooth rotation of the roller support bracket 1.

As stated hereinbefore, the caster roller described in the above embodiments is comprised of the roller support bracket 1 including the male member 6 made integral therewith and the base plate 9 including the female member 12 made integral therewith, the male member 6 being loosely fitted into the female member 12 and rotatably connected thereto, thereby assembling the roller support bracket 1 and the baee plate 9 together.

As described above with reference to the embodiment shown in FIGS. 1 to 3, the base plate 9 may be mounted directly or indirectly through the seat member B to the luggage C. The base plate 9 may be forcibly clamped into the seat member B against the action of spring provided for the seat member B.

If the luggage C is moved while rotating the roller 5 on the ground surface or the floor surface, the roller support bracket 1 is rotated about the center axis of the yoke 2 which is perpendicular to the rotary shaft of the roller 5 to change the moving direction of the luggage C. In this case, the opposed sliding surfaces of the male member 6 and the female member 12 are brought into point contact with each other directly through the projections 23 (FIG. 4) and the indentations 24 (FIG. 6) and indirectly through the projections 16 of the thrust sliding annular disc 15 (FIG. 2) and the projections 28 of the thrust sliding annular disc 26 (FIG. 9) in the thrust direction on the one hand and directly through the corners 14a of the shaft portion 14 (FIG. 3), the corners 6a of the male member 6 (FIG. 5) and the vertical grooves 25 (FIG. 7) and indirectly through the vertical ridges 29 (FIG. 10) in the radial direction on the other hand. The use of such bearing construction ensures a smooth change-over of the moving direction of the roller support bracket 1. This is due to the fact that the above mentioned bearing construction reduces the contact area to make the contact resistance small. In addition, both the roller support bracket 1 and the base plate 9 are formed of synthetic resin, so tht the roller support bracket 1 can be rotated in a smooth manner without supplying a lubricating oil to it.

In addition, the projections 16, 23, 28 or the indentations 24 make it possible to provide a support construction which is capable of bringing the sliding surface between the male member 6 and the female member 12 into a point contact in the thrust direction only. Particularly, it is preferable to reduce the contact area, between the sliding surfaces in a direction in which the load of the luggage C is applied. This causes the roller support bracket 1 to rotate in the horizontal plane in a snooth manner.

In accordance with the invention, both the roller support bracket 1 and the base plate 9 are formed of synthetic resin, for example, polyacetal resin or the like. As a result, the caster roller according to the invention provides a material decrease in weight if compared with the existing metal caster rollers.

In addition, the male member 6 of the roller support bracket 1 and the female member 12 of the base plate 9 are slidably connected with each other through the projections 16, 23, 28 and the indentations 24 provided for the sliding surface in the thrust direction on the one hand and through the corners 6a, 14a, vertical grooves 25, vertical ridges 29 provided for the sliding surface in the radial direction on the other hand. This support construction permits the luggage C to rotate on the horizontal surface in an extremely smooth manner when the luggage C is brought from place to place by manual effort. Since the caster roller according to the invention is formed of synthetic resin, it can be rotated quietly without generating any metal sound and noise. In addition, when it becomes dirty, it can easily be cleaned by washing with water. The caster roller according to the invention requires no precisely formed metal rotatable bodies as in existing caster rollers, so that it can easily be manufactured. In addition, the caster roller according to the invention requires no lubrication with oil and hence is good in maintenance.

In accordance with the invention, both the male member 6 and the female member 12 are cylindrical in shape and rotatably journalled with each other. As a result, the sliding surfaces are not directly exposed to the environment and hence the gap formed between the male member 6 and the female member 12 is prevented from being penetrated by dust, so that the rotation of the male member 6 relative to the female member 12 is not blocked by the presence of dust and hence any special dust preventive mechanism which has been provided as existing metal caster rollers is not required. Thus, the caster roller according to the invention is simple in construction and easy to manufacture. In addition, the caster roller according to the invention can obviate difficulty in rotation, so that it can rotate in a smooth manner and improve its manual operation. Moreover, the caster roller according to the invention is not apt to rust and also is resistant, so that it is long lived.

Both the roller support bracket 1 and the base plate 9 may continuously be formed by the convenient injection molding process on mass production scale and this provides a material increase in yield.

In addition, by loosely fitting the male member 6 into the female member 12 and by rotatably connecting these members together with the aid of the shaft portion 14 integrally formed with the female member 12 or with the aid of the connecting rod or post 20 extending through both the male and female members 6, 12 the roller support bracket 1 can be assembled with the base plate, 6, thereby simplifying the assembling operation and manufacturing the caster roller in a less expensive manner. In addition, it is possible to provide a colorful caster roller.

As stated hereinbefore, the invention can provide a new detachable luggage caster roller which can smoothly rotate during change in direction of movement of the luggage, improve handling and maintenance, be light in weight, reduce noise be. manufactured on a mass production scale and be simple to assemble and hence be less expensive.

Figure 13:
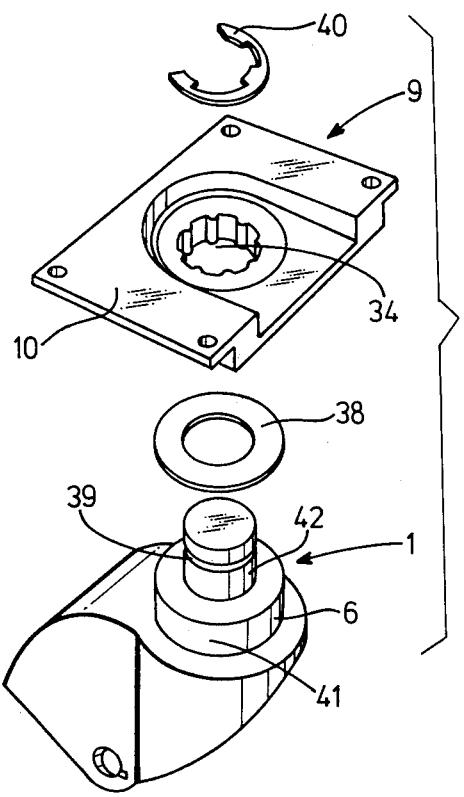
FIG. 13 is an exploded perspective view of main parts of the caster roller of FIG. 12.
Figure 14:
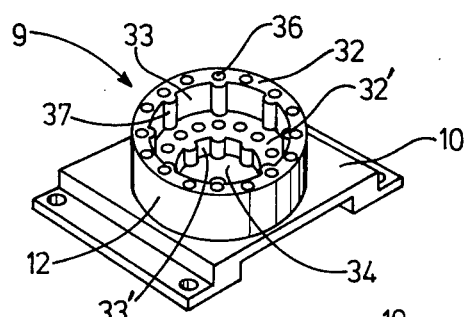
FIG. 14 is a perspective view of a base plate of the caster roller of FIG. 12 looking at the interior surface thereof.
Figure 15:
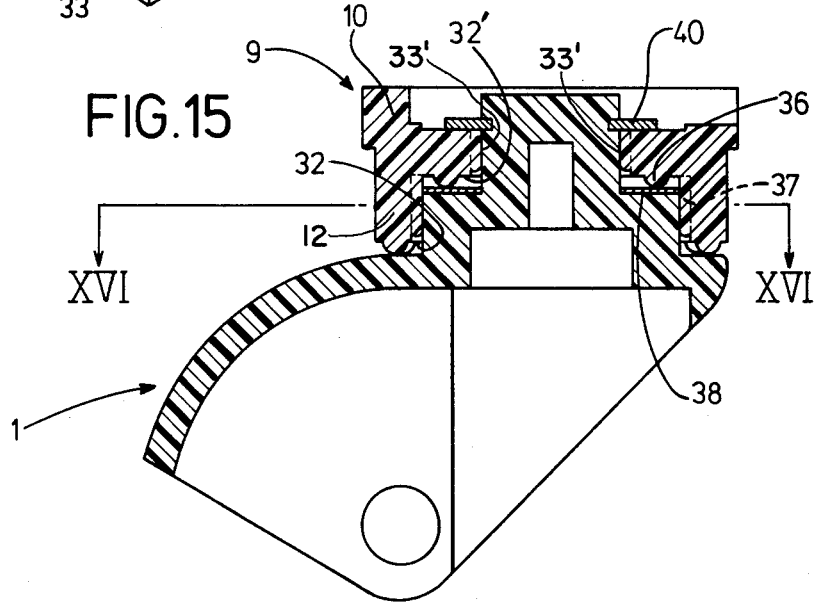
FIG. 15 is a vertical center sectional view of the base plate and the roller support bracket after they have been united.
Figure 16:
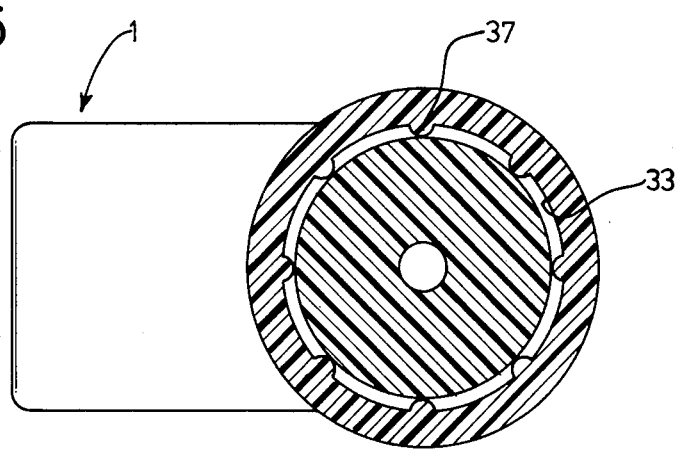
FIG. 16 is a sectional view taken on the line XVI—XVI of FIG. 15.

In another embodiment shown in FIGS. 12 to 16, the male member 6 of the roller support bracket 1 is comprised of a two stepped circular shaft portions which are different in diameter and length as shown in FIG. 13, while the female member 12 of the base plate 9 is comprised of two concentric inner and outer thrust surfaces 32, 32' and radial surfaces 33, 33'. The base 10 is provided at its center with a hole 34 adapted to be traversed by a reduced diameter portion 42 of the male member 6. That is, the surface of the base plate 9 which is located in the side wall of the hole 34 contacts the reduced diameter portion 42. The annular thrust surfaces 32, 32' are provided on their periphery with a plurality of projections 36 equally spaced apart from each other and each having a smooth surface and being semicylindrical in shape.

The radial surfaces 33, 33' are provided on their periphery with a plurality of vertical ridges 37 extending in parallel with the male shaft portion 6 and equally spaced apart from each other and each having a smooth surface and being semicylindrical in shape. Between the shaft portion 6 constituting the male member and the base plate 9 constituting the female member is inserted an annular disc 38 formed of metal, for example, stainless steel or the like and in contact with the projections 36 of the inner thrust surface 32 and the upper end of the large diameter shaft portion 41. The roller support bracket 1 is loosely fitted into the base plate 9 and carried rotatably by the latter through point contact at the thrust surfaces 32, 32' and line contact at the radial surfaces 33, 33'. The roller support bracket 1 is loosely fitted into the base plate 9 such that the front end of the reduced diameter portion or post 42 of the male member 6 projects from the rear end of the hole 34 of the base plate 9. The reduced diameter portion 42 of the male member 6 is provided around the outer peripheral surface thereof with a circumferential groove 39. The groove 39 is gripped by jaws of a metal clamp 40 so as to prevent the roller support bracket 1 from dropping out of the hole 34 of the base plate 9.

Both the roller support bracket 1 and the base plate 9 may be formed of various kinds of synthetic resin. But, it is most preferable to use a copolymer of formaldehyde and ethylene-oxide, i.e., acetal copolymer.

As stated hereinbefore, the caster roller assembly including the substantially rectangular base plate and the roller support bracket carried rotatably by the base plate is light in weight, anti-corrosive, water repellent, requires no lubricating oil and can be detachably assembled, so that the caster roller assembly can handle and rotate in an extremely easy and smooth manner Both the roller support bracket 1 and the base plate 9 are formed of synthetic resin such as a copolymer of formaldehyde and ethylene-oxide, so that it is possible to make its sliding friction coefficient equal to or smaller than that of a ball bearing formed of metal and fed with a lubricating oil and provide a construction which requires no movable members such as rotatable bodies.

In addition, use may be made of synthetic resin impregnated with lubricating oil so as to improve the lubricating property.

The point contact through the projections 36 and the line contact through the ridges 37 between the roller support bracket 1 and the base plate 9 provided a material decrease in sliding contact area and friction resistance, thereby slidably rotating the roller support bracket 1 with respect to the base plate 9 in a smooth manner.

A number of projections 36 ensure a uniform distribution of the load applied to both the roller support bracket 1 and the base plate 9. The stepped thrust surfaces 32, 32' provides those surfaces upon which a number of projections 36 can be provied in a convenient manner. In addition, the amount of the elastic deformation of the above mentioned synthetic resin is so large that the contact area and the amount of the elastic deformation of the projections 36 against the roller support bracket 1 can be conceived from the Herz principle, and that the projections 36 reach their elastic limit when subjected to the load on the order of a large suitcase.

The annular metal disc 38 inserted between the projections 36 provided for the inner thrust surface 32' of the base plate 9 and the front end surface of the large diameter shaft portion 41 of the roller support bracket 1 and having a thickness which is smaller than the amount of the elastic deformation or a suitable length of the radial surfaces 33, 33' serves to form a small gap between the projections 36 provided for the outer thrust surface 32 and the upper end surface of the roller support bracket 1. As a result, if the load applied to the base plate 9 causes the amount of the elastic deformation of the inner projections 36 to exceed a given amount, the projections 36 provided for the outer thrust surface 32 are brought into contact with the outer lower step surface of the roller support bracket 1, and hence it is possible to increase the buffer effect of the base plate 9 against externally applied shocks.

In addition, the use of the annular metal disc 38 formed of stainless steel prevents the stress from being concentrated or a part of the projections 36, and as a result, the load applied to the rooller support bracket 1 is uniformly distributed over all of the projections 36, thereby reducing the sliding friction encountered between the members formed of synthetic resin.

The vertical ridges 37 provided for the outer and inner concentric radial surfaces 33, 33' make line contact with the large and reduced diameter shaft portions 41, 42 of the roller support bracket 1 in parallel with the common center axis thereof, so that the roller support bracket 1 is prevented from being swung in a transverse direction and can rotate through the thrust surfaces 32, 32' in a smooth manner.

The caster roller has such a dynamic characteristic that a force is applied to the roller support bracket 1 in a direction perpendicular to the axial direction of the bracket 1. This force is received by the vertical ridges 37 provided for the stepped radial surfaces 33, 33' having different diameters, so that it is possible to prevent the stress from being locally concentrated, which would otherwise occur due to the difference in moments in the lengthwise direction of the roller support bracket 1.

As described above, the roller support bracket 1 has point and line contacts with th base plate 9 to form gaps therebetween. These gaps play a role of radiating friction beat. That is, air surrounding the projections 36 and vertical ridges 37 and heated by the friction heat rises by convection and leaves the upper end of the reduced shaft portion 42 of the roller support bracket 1. As a result, cold air is sucked from the outer thrust surface 32 upwardly to cool the friction parts.

In addition, the metal annular disc 38 inserted between the projections 36 of the inner thrust surface 32' and the upper end surface of the large diameter shaft portion 41 of the roller support bracket 1 has a thermal conductivity which is far superior to that of the synthetic resin and seves to rapidly absorb the friction heat produced in the projections 36 and diffuse it into the metal annular disc 8, thereby preventing local and thermal deformation of the projections 36.

The base plate 9 may be integrally formed of synthetic resin in one direction and hence may be formed by the convenient injection molding process or the like on a mass production scale.

The synthetic resin per se can easily be colored without requiring any painting process. As a result, the caster roller according to the invention may be formed by reducing the number of working steps and made colorful in appearance so as to match the color of the luggage.

As above mentioned, the roller support bracket 1 is carried rotatably by the base plate 9 through point and line contact surfaces each having a small sliding friction coefficient, so that rotation of the roller support bracket 1 causes no noise.

As stated hereinbefore, the caster roller according to the invention has a number of advantages. In the first place, absence of precisely worked rolling bodies such as metal balls provided a material decrease in the number of steps of mass production and hence provides a less expensive product. Secondly, the use of synthetic resin having a high rigidity ensures a production of the caster roller which is mechanically strong and long lived. Third, absence of lubricating oil and no occurrence of rust make the cleaning such as by water washing and the like simple and easy and hence substantially maintenance free. Finally, it is possible to provide a beautiful freely colored product in appearance.

Figure 17:
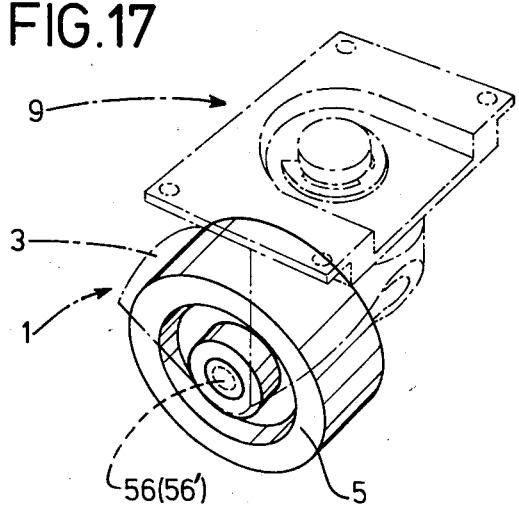
FIG. 17 is a perspective view of a caster roller according to the invention, the roller being shown in rotatably mounted state in a roller support bracket rotatably carried by a base plate.
Figure 18:
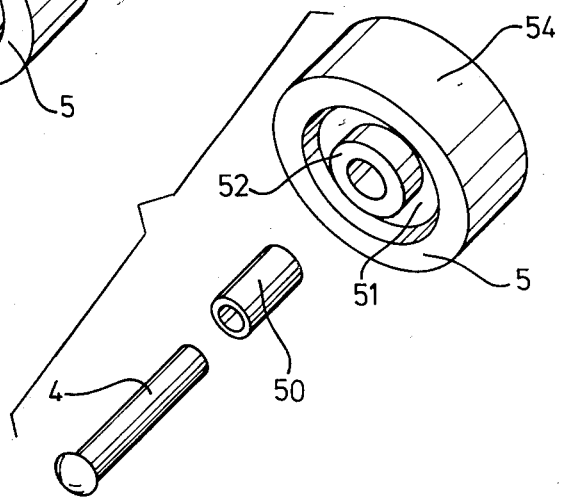
FIG. 18 is an exploded perspective view of main parts of the caster roller of FIG. 17.
Figure 19:
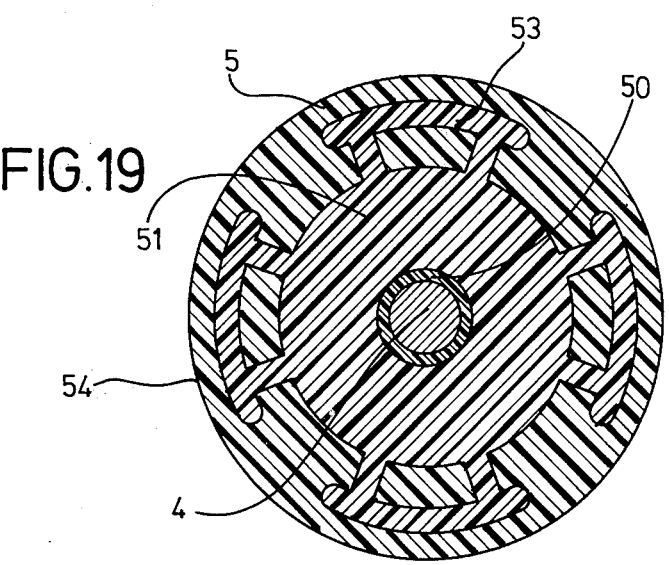
FIG. 19 is a center sectional view through the rotational shaft of the caster roller of FIG. 17 in an enlarged scale.

In FIGS. 17 to 19 is shown a roller per se according to the invention. The roller shown is comprised of a rim 51 and boss 52 both integrally formed of synthetic resin such as nylon resin having a small coefficient of friction and a high rigidity. Around the periphery of the rim 51 are integrally formed a plurality of bridge-shaped ribs 53 equally spaced apart from each other in a circumferential direction. These ribs 52 are embedded in synthetic resin having a wear resistance such as polyurethane resin to form a tread 54. The tread 54 may be formed by a molding or bonding process to complete a caster roller. Through the boss 52 is rotatably extended a sleeve bearing 50 formed of a copolymer consisting of formaldehyde and ethylene-oxide and impregnated with lubricating oil. The roller 5 provided therein with the sleeve bearing 50 is embraced by two legs of the roller support bracket 3 and a metal rotary shaft 4 is extended through holes 56, 56' provided for the two legs of the bracket 3 and the sleeve bearing 50 whereby the roller 5 is mounted rotatably in the bracket 3.

The caster roller constructed as above described in accordance with the invention is light in weight and can make the rate of wear of the tread 54/20times smaller than that of the tread formed of rubber, thereby giving a considerably longer life.

In addition, the roller per se according to the invention has a number of advantages. In the first place, the use of the sleeve bearing 50 which does not require any lubrication of oil causes the roller to continue in good operative condition. Secondly, the rotation of the sleeve bearing 50 per se ensures a smooth rotation of the roller 5. Third, the use of the sleeve bearing 50 which operates as a lubricating body causes no deformation of the sleeve bearing 50 without requiring any complex mechanism such as various kinds of oil seal and any other protective devices and the like. Fourth, all of the boss 52, sleeve bearing 50 and rotary shaft 4 are brought into surface contact with each other, so that the load applied to the roller 5 can uniformly be distributed. Finally, there are no metal-to-metal contact portions and inclusions such as dust can not penetrate into the roller, so that the roller can be used without generating noise.

The presence of the bridge-shaped ribs 53 arranged circumferentially along the rim 51 makes it possible to firmly connect the tread 54 to the rim 51 when the tread 54 is molded or bonded to the rim 51 and to reinforce the tread 54.

As stated hereinbefore, the invention renders it possible to provide a roller by combining various kinds of synthetic resins having different mechanical properties and adapted to be selectively colored such that these synthetic resins are most useable for respective parts of the roller. As a result, the roller according to the invention makes it possible to reduce its weight by 60% from that of the conventional metal roller, is strong, can rotate without any noise and maintain the lubricating function of the sleeve bearing impregnated with the lubricating oil as long as the roller keeps its life, can rotate in a smooth manner and provides a beautiful color roller in appearance.

What is claimed is:

1. A detachable luggage caster roller comprising a base plate formed of synthetic resin, means to secure said base plate detachably to a piece of luggage, the base plate including a cylindrical female member having a sliding surface, a roller support bracket formed of synthetic resin and including a cylindrical male member that extends up into said female member, a post connecting said male and female members for rotation relative to each other about their common axes, said male member including a sliding surface directly or indirectly opposed to and rotatably engaged with said sliding surface of said female member through point and line contacts in a thrust or radial direction, and a roller mounted rotatably in said roller support bracket whereby said roller is enabled to freely swivel about said common axis, the axis of rotation of the roller being perpendicular to and spaced from said common axis.

2. A detachable luggage caster roller as claimed in claim 1, wherein said base plate includes inner and outer stepped annular thrust surfaces as well as concentric radial surfaces and is provided at its center with a hole, and said roller support bracket includes a stepped shaft portion consisting of a large diameter shaft portion and a reduced diameter shaft portion, said shaft portions which comprises said post being formed to define thrust and radial surfaces opposed to said thrust and radial surfaces of said base plate, respectively, said annular thrust surfaces of said base plate being provided with a plurality of projections each having a smooth surface and semispherical in shape, said radial surfaces of said base plate being provided with a plurality of vertical ridges each having a smooth curved surface and extending in parallel with and opposed to each of said shaft portions, and an annular metal disc inserted between said projections provided for said inner thrust surface of said base plate and said inner thrust surface of said roller support bracket.

3. A detachable luggage caster roller as claimed in claim 1, in which said post is integral with said base plate.

4. A detachable luggage caster roller as claimed in claim 1, in which said post is integral with said roller support bracket.

5. A detachable luggage caster roller as claimed in claim 1, in which said post is a piece separate from but secured to each of said base plate and roller support bracket.

6. A detachable luggage caster roller as claimed in claim 1, and anti-friction means between the upper end of said male member and the inside of said female member, said female member extending down over and covering said anti-friction means.

* * * * *